(12) United States Patent
Lim et al.

(10) Patent No.: US 9,285,633 B2
(45) Date of Patent: Mar. 15, 2016

(54) LIQUID CRYSTAL DISPLAY

(71) Applicant: SAMSUNG DISPLAY CO., LTD., Yongin, Gyeonggi-Do (KR)

(72) Inventors: Kyu-Hun Lim, Asan-Si (KR); Yeong Bong Kang, Asan-Si (KR); Yoon-Ho Kim, Seoul (KR); Kwang Hyun Baek, Asan-Si (KR); Jeong Weon Seo, Hwaseong-Si (KR); Yi Soo Won, Wonju-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 401 days.

(21) Appl. No.: 13/830,052

(22) Filed: Mar. 14, 2013

(65) Prior Publication Data

US 2014/0071376 A1 Mar. 13, 2014

(30) Foreign Application Priority Data

Sep. 10, 2012 (KR) ........................ 10-2012-0100045

(51) Int. Cl.
*G02F 1/1335* (2006.01)
*G02F 1/1333* (2006.01)

(52) U.S. Cl.
CPC ...... *G02F 1/133615* (2013.01); *G02F 1/13338* (2013.01); *G02F 1/133308* (2013.01); *G02F 2201/46* (2013.01); *G02F 2202/28* (2013.01)

(58) Field of Classification Search
CPC .......... G02F 1/133308; G02F 1/13338; G02F 1/1335; G02F 1/1336; G02F 1/133524; G02F 1/133608; G02F 1/133305; G02F 1/133615; G02F 2001/133317; G02F 2001/133314; G02F 2001/13332; G02F 2001/133331; G02F 2001/133311; G02F 2001/133325; G02F 2201/46; G02F 2201/50; G02F 2202/28; H05K 7/1427; H05K 7/02; H05K 1/0215; H05K 5/03; G06F 1/1637; G06F 3/03547
USPC ................... 349/58, 12, 65, 60, 122, 40, 158; 345/173, 102; 362/633, 97.1, 611, 612, 362/622; 361/748; 348/794, 373; 359/609
See application file for complete search history.

(56) References Cited

U.S. PATENT DOCUMENTS

| 8,184,241 | B2 * | 5/2012 | Kubota et al. ................... 349/96 |
| 8,368,866 | B2 * | 2/2013 | Lee et al. ....................... 349/161 |
| 2010/0283935 | A1 | 11/2010 | Park et al. |
| 2011/0128463 | A1 * | 6/2011 | Ji ...................... G02F 1/133308 349/58 |
| 2011/0164372 | A1 | 7/2011 | McClure et al. |
| 2011/0235364 | A1 * | 9/2011 | Lo et al. ........................ 362/611 |
| 2011/0261282 | A1 | 10/2011 | Jean et al. |

(Continued)

FOREIGN PATENT DOCUMENTS

| JP | 2012-018207 | 1/2012 |
| KR | 1020050070718 | 7/2005 |

(Continued)

*Primary Examiner* — Thoi Duong
(74) *Attorney, Agent, or Firm* — F. Chau & Associates, LLC

(57) ABSTRACT

A liquid crystal display includes: a liquid crystal panel, a backlight assembly disposed at one side surface of the liquid crystal panel, a side frame including a first surface surrounding an edge of the liquid crystal panel and a second surface surrounding a side surface of the backlight assembly and an external panel attached to another side surface of the liquid crystal panel and on the side frame, in which a height of the first surface of the side frame is substantially equal to a height of a surface of the liquid crystal panel, and a width of the first surface of the side frame is larger than a width of the second surface of the side frame.

20 Claims, 7 Drawing Sheets

(56) References Cited

U.S. PATENT DOCUMENTS

2012/0026433 A1 2/2012 Lee et al.
2012/0062815 A1 3/2012 Kim et al.

FOREIGN PATENT DOCUMENTS

| KR | 1020070104172 | 10/2007 |
| KR | 1020080067086 | 7/2008 |
| KR | 10-0868296 | 11/2008 |
| KR | 1020090074666 | 7/2009 |
| KR | 1020100119982 | 11/2010 |
| KR | 1020110030953 | 3/2011 |
| KR | 1020110061027 | 6/2011 |
| KR | 1020120005872 | 1/2012 |
| KR | 1020120025939 | 3/2012 |

* cited by examiner

LIQUID CRYSTAL DISPLAY

CROSS-REFERENCE TO RELATED APPLICATION

This application claims priority to Korean Patent Application No. 10-2012-0100045 filed on Sep. 10, 2012, the disclosure of which is hereby incorporated by reference herein in its entirety.

(a) Technical Field

The present disclosure relates to a liquid crystal display.

(b) Discussion of the Related Art

A liquid crystal display is one of the currently most widely used flat panel displays, and includes two display panels in which electric field generation electrodes, such as a pixel electrode and a common electrode, are formed, and a liquid crystal layer interposed therebetween. The liquid crystal display generates an electric field in the liquid crystal layer by applying a voltage to the electric field generating electrode. In addition, the liquid crystal display may determine the direction of liquid crystal molecules through the generated electric field, and control the polarization of incident light to display an image.

As the liquid crystal display is not a self-emissive display device, a backlight for supplying light to the liquid crystal layer may be necessary.

Recently, a demand for a liquid crystal display which is thin, light, and easily portable, and is not easily damaged from external impact has been increased.

For example, a liquid crystal display may be assembled in such a manner that a backlight assembly is supported by using a bottom chassis, a liquid crystal panel is seated on the backlight assembly, the liquid crystal panel and the back light assembly are coupled by using a top chassis, and then tempered glass is attached on an upper surface of the top chassis by using an adhesive. In this case, the top chassis has the upper surface surrounding an edge of the liquid crystal panel.

As such, in a case of the liquid crystal display in which the liquid crystal panel and the backlight assembly supported by the bottom chassis are assembled with each other by the top chassis, as the upper surface of the top chassis surrounds the edge of the liquid crystal panel, the upper surface of the top chassis is higher than an upper surface of the liquid crystal panel.

Accordingly, a certain space may be created between the tempered glass attached on the upper surface of the top chassis and the liquid crystal pane, and thus, for example, dust, moisture, or the like may inflow along the space, and a quality of the liquid crystal panel may be deteriorated by the dust or the moisture. Further, a stain and the like may be recognized by the space. Further, as the tempered glass is attached to the top surface of the top chassis, the adhesive strength between the liquid crystal panel and the tempered glass may be decreased and thus the coupling strength between the tempered glass and the liquid crystal panel may be deteriorated, thereby causing the liquid crystal display to be damaged.

SUMMARY OF THE INVENTION

Exemplary embodiments of the present invention provide a liquid crystal display in which an unnecessary space is not created between a liquid crystal panel and a tempered glass, and the adhesive strength between the liquid crystal panel and the tempered glass is excellent. An exemplary embodiment of the present invention provides: a liquid crystal display including; a liquid crystal panel, a backlight assembly disposed at one side surface of the liquid crystal panel, a side frame including a first surface surrounding an edge of the liquid crystal panel and a second surface surrounding a side surface of the backlight assembly and an external panel attached to another side surface of the liquid crystal panel and on the side frame, in which a height of the first surface of the side frame is substantially equal to a height of a surface of the liquid crystal panel, and a width of the first surface of the side frame is larger than a width of the second surface of the side frame.

The liquid crystal display may further include an adhesive layer disposed between the first surface of the side frame and the surface of the liquid crystal panel, and the external panel.

The external panel may be tempered glass or a touch panel.

The liquid crystal display may further include a lower case configured to receive the backlight assembly, and a horizontal surface of the lower case covers a surface of the backlight assembly, and a vertical surface of the lower case covers a side surface of the backlight assembly.

The vertical surface of the lower case may be disposed between the second surface of the side frame and the backlight assembly.

The liquid crystal display may further include an external cover configured to receive the lower case and the side frame.

The liquid crystal display may further include a plurality of coupling members configured to couple the side frame, the lower case, and the external cover.

The liquid crystal display may further include a conductive contacting layer disposed between the first surface of the side frame and the liquid crystal panel.

The liquid crystal panel may include a lower display panel including a thin film transistor and an upper display panel including a color filter, and an additional transparent electrode layer may be disposed on an external surface which does not face the lower display panel in a surface of the upper display panel, and the additional electrode layer may be electrically connected to the side frame through the conductive contacting layer.

In accordance with an exemplary embodiment of the present invention, a liquid crystal display is provided. The liquid crystal display includes a liquid crystal panel, a backlight assembly disposed at one side surface of the liquid crystal panel, a side frame including a first surface surrounding side surfaces of the liquid crystal panel and a second surface surrounding and supporting the backlight assembly, in which a height of the first surface of the side frame is substantially the same as that of a surface of the liquid crystal panel, and a width of the first surface of the side frame is larger than a width of the second surface of the side frame. The first surface of the side frame is configured to receive the liquid crystal panel while surrounding the liquid crystal panel along four edges of the liquid crystal panel, and the second surface of the side frame is configured to receive the backlight assembly, thereby the side frame being configured to receive the liquid crystal panel and the backlight assembly together while surrounding the side surfaces and the four edges of the liquid crystal panel and the backlight assembly, so that the liquid crystal panel and the backlight assembly are coupled.

The liquid crystal display further includes an adhesive layer disposed on the first surface of the side frame and on a portion of the liquid crystal panel, an external panel attached to the first surface of the side frame and on a portion of the liquid crystal panel by the adhesive, a first external cover disposed on an exterior of the side frame surrounding side surfaces of the backlight assembly and the liquid crystal panel; and a driving chip disposed between the first external cover and the side frame and attached to the external panel via the adhesive disposed on a surface of the driving chip.

As described above, in the liquid crystal display according to the exemplary embodiments of the present invention, the liquid crystal panel is coupled to the backlight assembly by using the side frame surrounding a side surface of the liquid crystal panel, tempered glass or a touch panel is attached on the entire surfaces of the side frame and the liquid crystal panel, so that an unnecessary space is not created between the liquid crystal panel and the tempered glass or the touch panel attached on the liquid crystal panel. Accordingly, display quality deterioration, such as a stain, due to a step between a receiving part of the liquid crystal panel and the backlight assembly is not generated, dust or moisture may be prevented from inflowing to a space between the tempered glass or the touch panel and the liquid crystal panel, and the liquid crystal display may be thin.

Further, a width of the first surface of the side frame surrounding the liquid crystal panel is formed to be larger than that of the second surface surrounding the side surface of the backlight assembly, so that coupling strength between the backlight assembly and the tempered glass or the touch panel is increased, thereby increasing the reliability of packaging of the liquid crystal display.

BRIEF DESCRIPTION OF THE DRAWINGS

Exemplary embodiments of the present invention can be understood in more detail from the following detailed description taken in conjunction with the accompanying drawings in which.

DETAILED DESCRIPTION OF EXEMPLARY EMBODIMENTS

Figure 1:
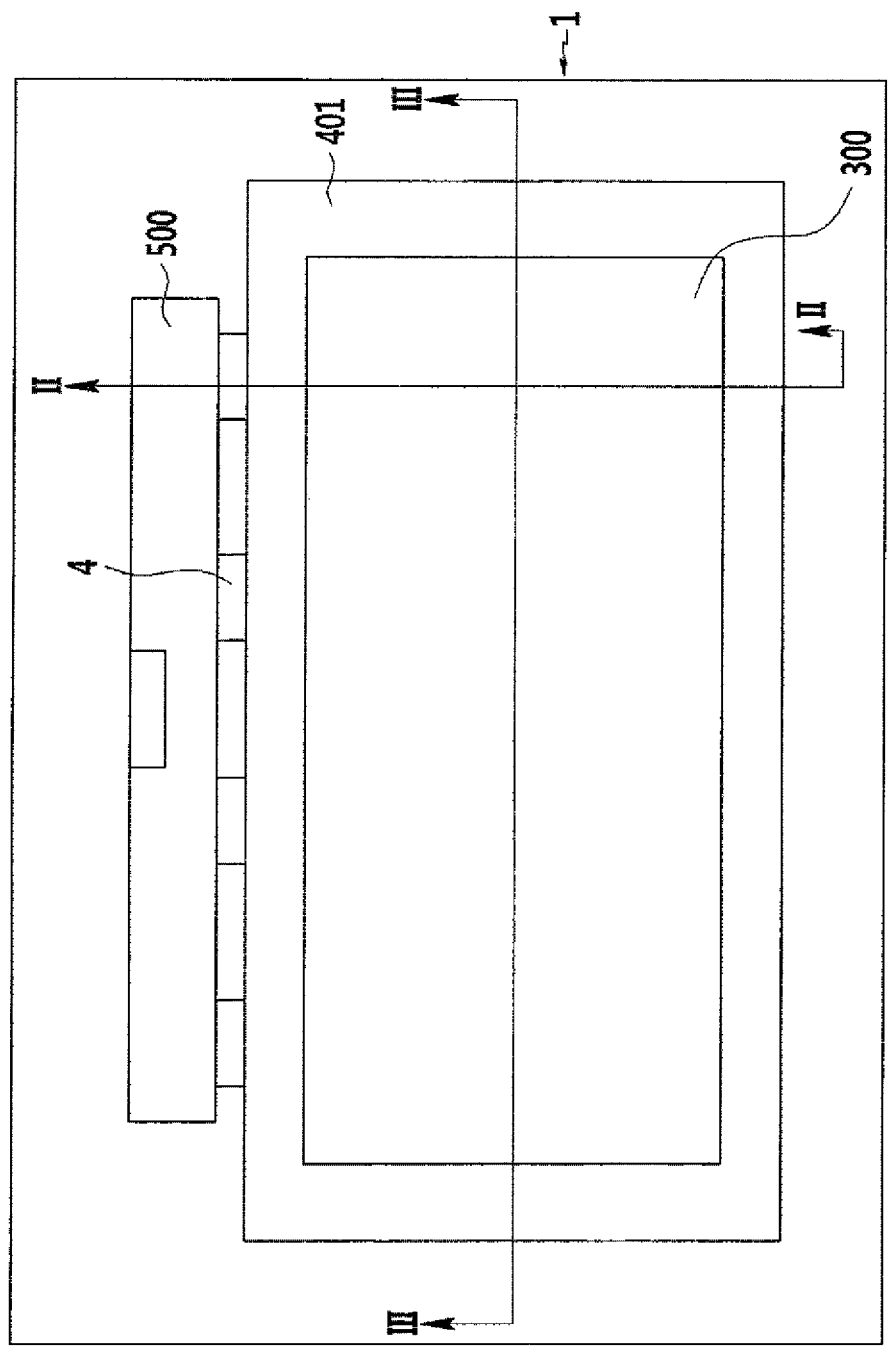
FIG. 1 is a schematic position diagram of a liquid crystal display according to an exemplary embodiment of the present invention.

Exemplary embodiments of the present invention will be described more fully hereinafter with reference to the accompanying drawings, in which exemplary embodiments of the invention are shown.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

As used herein, the singular forms, "a", "an", and "the" are intended to include plural forms as well, unless the context clearly indicates otherwise.

A liquid crystal display according to an exemplary embodiment of the present invention will be described with reference to FIGS. 1 to 4. FIG. 1 is a schematic position diagram of a liquid crystal display according to an exemplary embodiment of the present invention, FIG. 2 is a cross-sectional view illustrating the liquid crystal display of FIG. 1 taken along line II-II, FIG. 3 is a cross-sectional view illustrating the liquid crystal display of FIG. 1 taken along line III-III, and FIG. 4 is a diagram illustrating an enlarged part of the liquid crystal display of FIG. 3.

Referring to FIG. 1, a liquid crystal display 1 according to the exemplary embodiment includes, for example, a side frame 401 surrounding a side surface of a liquid crystal panel 300, a printed circuit (printed board assembly) 4, and a driving chip (driver IC) 500 attached to the printed circuit. The side frame 401 may have conductivity and be made of, for example, a metal.

Figure 2:
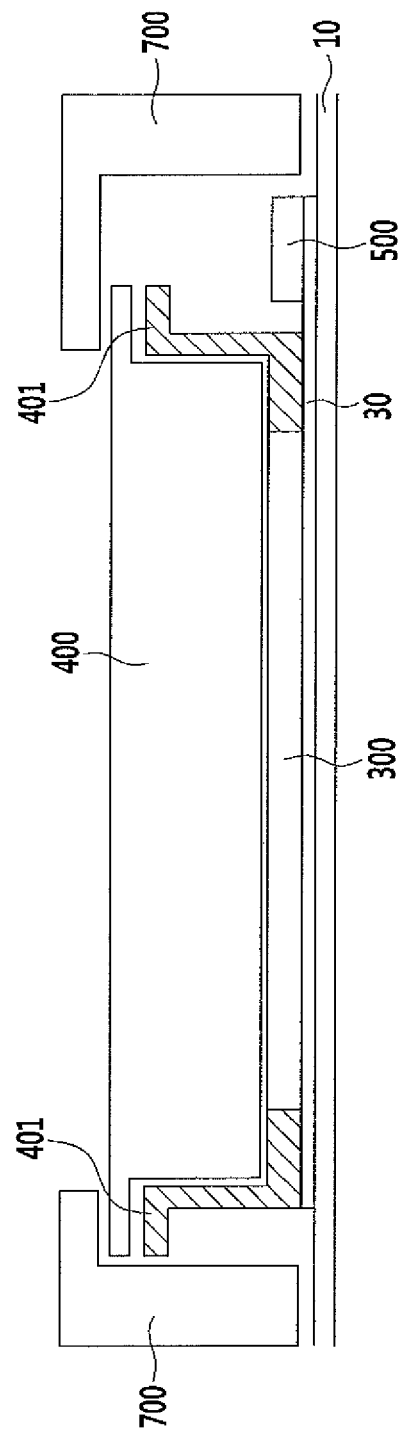
FIG. 2 is a cross-sectional view illustrating the liquid crystal display of FIG. 1 taken along line II-II.
Figure 3:
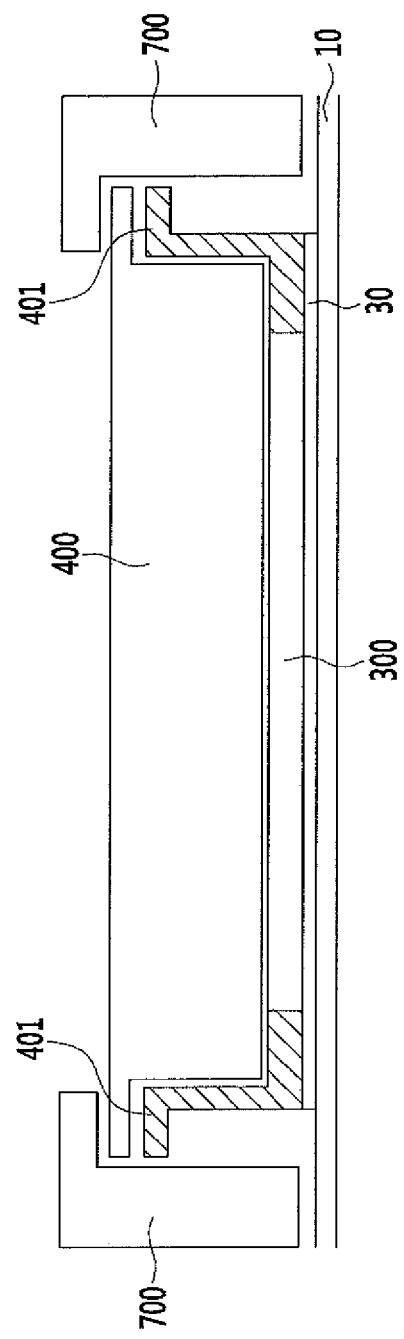
FIG. 3 is a cross-sectional view illustrating the liquid crystal display of FIG. 1 taken along line III-III.
Figure 4:
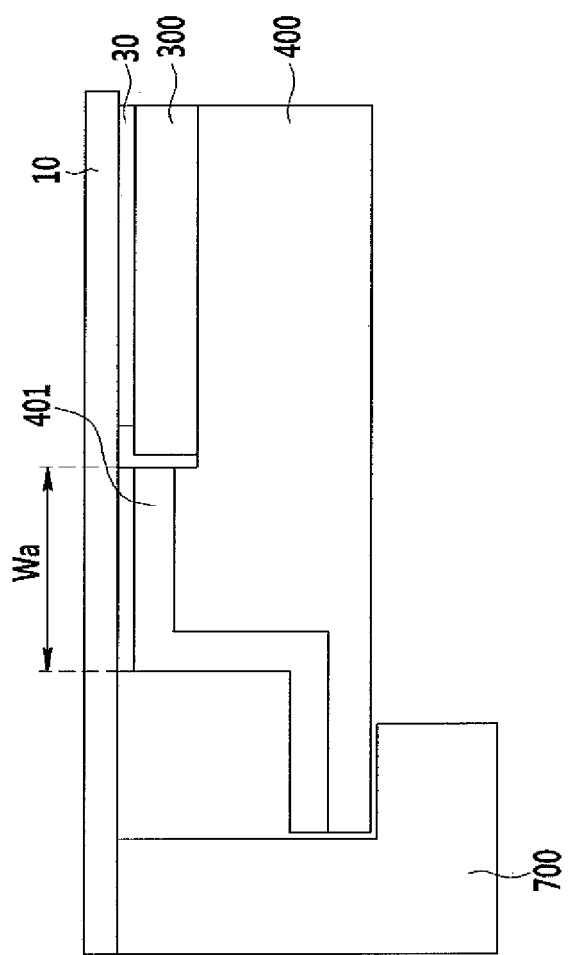
FIG. 4 is a diagram illustrating an enlarged part of the liquid crystal display of FIG. 3.

Referring to FIGS. 2 and 3, a backlight assembly 400 is positioned, for example, at one side surface of the liquid crystal panel 300. The backlight assembly 400 and the liquid crystal panel 300 are coupled to each other by using, for example, the side frame 401. The side frame 401 includes, for example, a first surface surrounding a side surface of the liquid crystal panel 300 and a second surface surrounding and supporting the backlight assembly 400. Referring to FIG. 1, the first surface of the side frame 401 has, for example, a plane shape surrounding the liquid crystal panel 300.

For example, as illustrated in FIGS. 1 to 3, the first surface of the side frame 401 surrounds the side surface of the liquid crystal panel 300, and a height of the first surface of the side frame 401 is the same as or substantially the same as that of a surface of the liquid crystal panel 300. That is, the first surface of the side frame 401 receives the liquid crystal panel 300 while surrounding the liquid crystal panel 300 along four edges of the liquid crystal panel 300, and the second surface of the side frame 401 receives the backlight assembly 400. Accordingly, the side frame 401 receives the liquid crystal panel 300 and the backlight assembly 400 together while surrounding the side surfaces of the liquid crystal panel 300 and the backlight assembly 400, so that the liquid crystal panel and the backlight assembly 400 are coupled.

An adhesive layer 30 is positioned, for example, on the first surface of the side frame 401 and the surface of the liquid crystal panel 300, and an external panel 10 is attached to the first surface of the side frame 401 and the surface of the liquid crystal panel 300 by using the adhesive layer 30. The external panel 10 is an additional panel, such as, for example, tempered glass or a touch panel, attached to the surface of the liquid crystal panel 300. When the external panel 10 is tempered glass, the liquid crystal panel 300 may be protected from external impact. When the external panel 10 is a touch panel, the display of the liquid crystal panel 300 may be controlled according to an external touch. The external panel 10 may include at least one of, for example, tempered glass and a touch panel, and may include any structure having another shape attachable to the outside of the liquid crystal panel 300.

A first external cover 700 is positioned on an exterior of the side frame 401 surrounding the side surfaces of the backlight assembly 400 and the liquid crystal panel 300. A driving chip 500 is positioned between the first external cover 700 and the side frame 401. The adhesive layer 30 may also be positioned on a surface of the driving chip 500, so that the driving chip 500 may be attached to the external panel 10.

Although it is not illustrated, the liquid crystal display 1 may further include, for example, a coupling member for coupling the side frame 401 surrounding the liquid crystal panel 300 and the backlight assembly 400 and the first external cover 700. The coupling member may be, for example, a screw and the like for connecting so that the side frame 401 is coupled to the first external cover 700. For example, other possible coupling members may include nails or bolts.

The side frame 401 for coupling the liquid crystal panel to the backlight and the backlight assembly 400 of the liquid crystal display according to the exemplary embodiment will be described in more detail with reference to FIG. 4.

Referring to FIG. 4, the side frame 401 includes, for example, the first surface surrounding the side surface of the liquid crystal panel 300 and the second surface surrounding the side surface of the backlight assembly 400. The first surface and the second surface are continuously positioned. Accordingly, the side frame 401 couples the liquid crystal panel 300 and the backlight assembly 400 while surrounding the side surface of the backlight assembly 400 together with the side surface of the liquid crystal panel 300.

As described above, the height of the first surface of the side frame 401 of the liquid crystal display according to the present exemplary embodiment is the same as or substantially the same as that of the surface of the liquid crystal panel 300. Accordingly, as a step between the side frame 401 and the liquid crystal panel 300 is not generated, an unnecessary space is not created between the liquid crystal panel 300 and the external panel 10 attached on the liquid crystal panel 300. As described above, as a surface step between the side frame 401 for coupling and receiving the liquid crystal panel 300 and the backlight assembly 400 and the liquid crystal panel 300 is not generated, display quality deterioration, such as, for example, a stain, due to the step between a receiving part of the liquid crystal panel and the backlight assembly is not generated, dust or moisture may be prevented from inflowing to a space between the tempered glass or the touch panel and the liquid crystal panel, and the liquid crystal display may be thin.

Further, as illustrated, a width Wa of the first surface of the side frame 401 is formed to be larger than that of the second surface, so that an area of the adhesive layer 30 positioned between the side frame 401 and the external panel 10 is widened and thus coupling strength between the side frame 401 and the external panel 10 is increased. Accordingly, the coupling strength between the external panel 10 and the side frame 401 is increased, thereby increasing reliability of packaging of the liquid crystal display.

Further, as the step is not generated between the side frame 401 for coupling and receiving the liquid crystal panel 300 and the backlight assembly 400 and the liquid crystal panel 300, the adhesive layer 30 may be disposed between the external panel 10 and the liquid crystal panel 300, as well as between the external panel 10 and the side frame 401, so that the coupling strength between the external panel 10, the liquid crystal panel 300, and the backlight assembly 400 is increased.

Figure 5A:
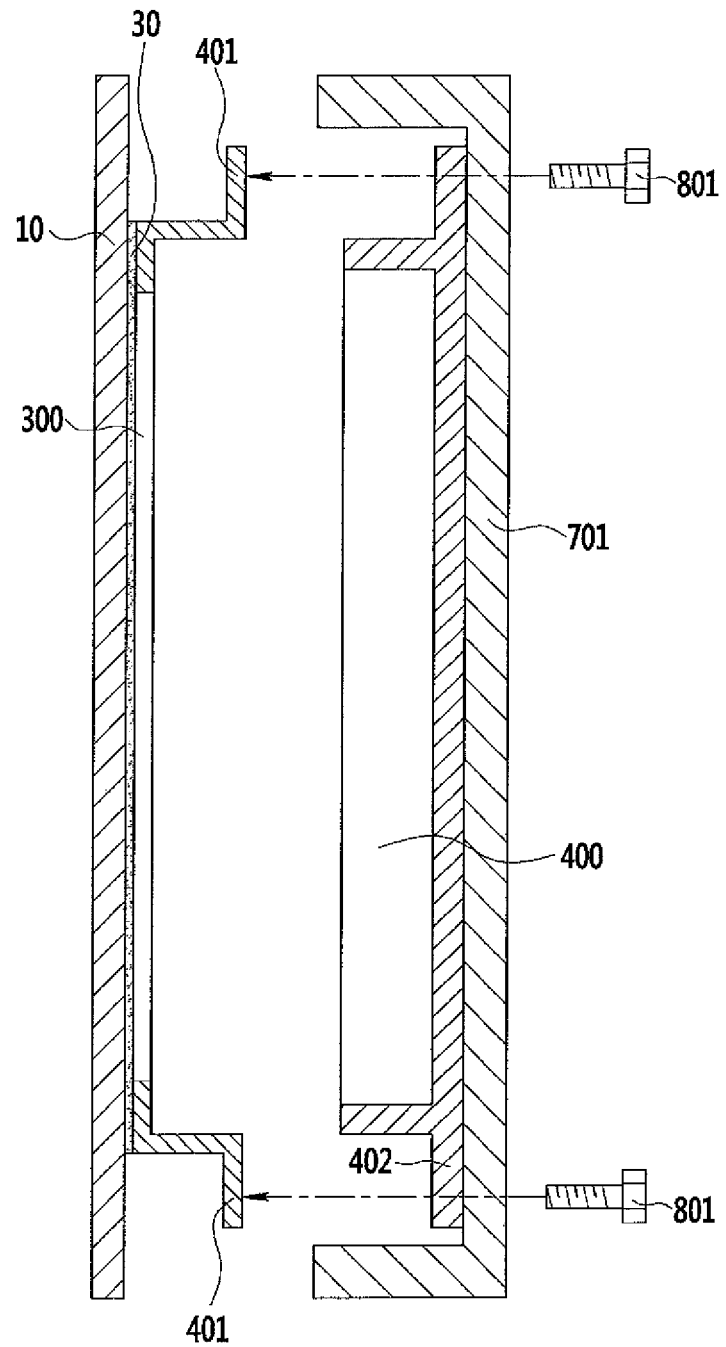
FIG. 5A is a cross-sectional view of a liquid crystal display according to an exemplary embodiment of the present invention.

A liquid crystal display according to an exemplary embodiment of the present invention and coupling of a liquid crystal panel and a backlight assembly of the liquid crystal display will be described with reference to FIGS. 5A and 5B. FIG. 5A is a cross-sectional view of the liquid crystal display according to an exemplary embodiment of the present invention, and FIG. 5B is a concept diagram for describing assembling of the liquid crystal display according to an exemplary embodiment of the present invention.

The liquid crystal display according to the present exemplary embodiment is similar to the liquid crystal display illustrated in FIGS. 1 to 4. Descriptions of the same constituent elements will be omitted.

Figure 5B:
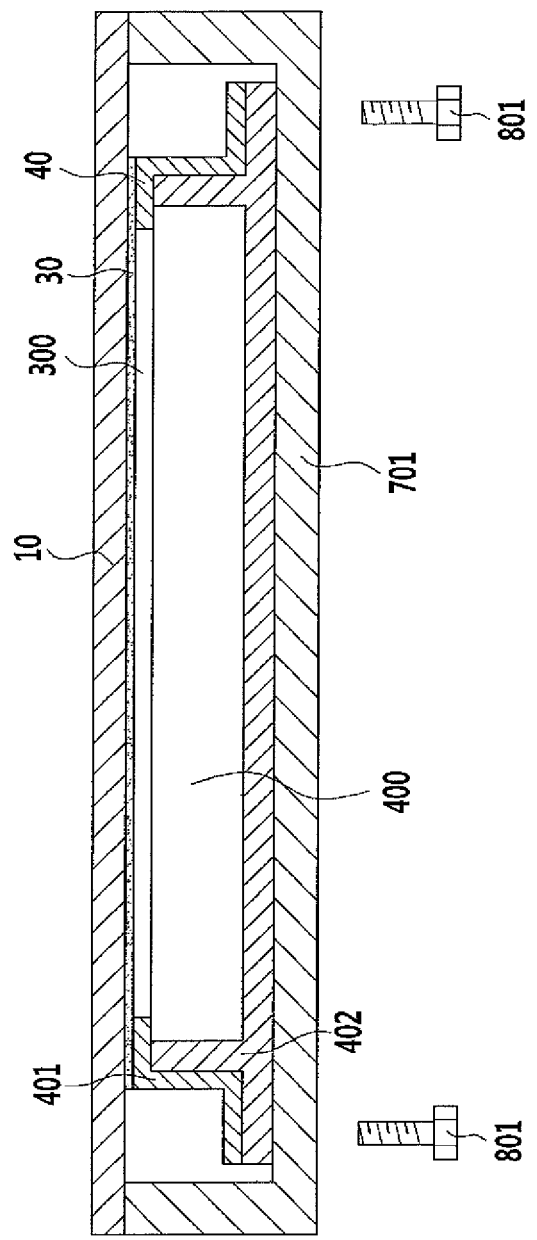
FIG. 5B is a concept diagram for describing assembling of a liquid crystal display according to an exemplary embodiment of the present invention.

Referring to FIGS. 5A and 5B, the liquid crystal display according to the present exemplary embodiment includes, for example, a side frame 401 surrounding side surfaces of a liquid crystal panel 300 and a backlight assembly 400, a lower case 402 for receiving the backlight assembly 400, the liquid crystal panel 300, the backlight assembly 400, the side frame 401, and a first external cover 701 for receiving the lower case 402. Contrary to the liquid crystal display according to FIGS. 1 to 4, the liquid crystal display according to the present exemplary embodiment further includes, for example, the lower case 402 for receiving the backlight assembly 400, and the side frame 401 has a shape surrounding a side surface of the lower case 402. The lower case 402 includes, for example, a horizontal surface covering an entire lower surface of the backlight assembly 400 and a vertical surface surrounding the side surface of the backlight assembly 400.

An adhesive layer 30 is positioned on surfaces of the side frame 401 and the liquid crystal panel 300, and the side frame 401 and the liquid crystal panel 300 are coupled to an external panel 10 through the adhesive layer 30.

The liquid crystal display according to the present exemplary embodiment further includes, for example, a plurality of coupling members 801, and the side frame 401, the lower case 402 for receiving the backlight assembly 400, and the first external cover 701 are coupled to each other through the plurality of coupling members 801.

Contrary to the liquid crystal display according to FIGS. 1 to 4, the liquid crystal display according to the present exemplary embodiment further includes, for example, the lower case 402 for receiving the backlight assembly 400, and the second surface of the side frame 401 is coupled to the lower case 402 while being in contact with the vertical surface of the lower case 402 for receiving the backlight assembly 400.

In the present exemplary embodiment, the lower case 402 for receiving the backlight assembly 400 is received inside the first external cover 701. The first external cover 701, the lower case 402 for receiving the backlight assembly 400, and the side frame 401 surrounding the side surface of the liquid crystal panel 300 are coupled together through the coupling members 801.

That is, the side frame 401 of the liquid crystal display according to the present exemplary embodiment surrounds the side surface of the liquid crystal panel 300 and a vertical surface of the lower case for receiving the backlight assembly 400, and thus the liquid crystal panel 300 is coupled to the backlight assembly 400.

The coupling member 801 includes any form, such as, for example, a screw, capable of coupling a plurality of layers. For example, other possible coupling members 801 may include nails or bolts.

All of the many characteristics of the liquid crystal display according to FIGS. 1 to 4 may be applied to the liquid crystal display according to the present exemplary embodiment.

Figure 6:
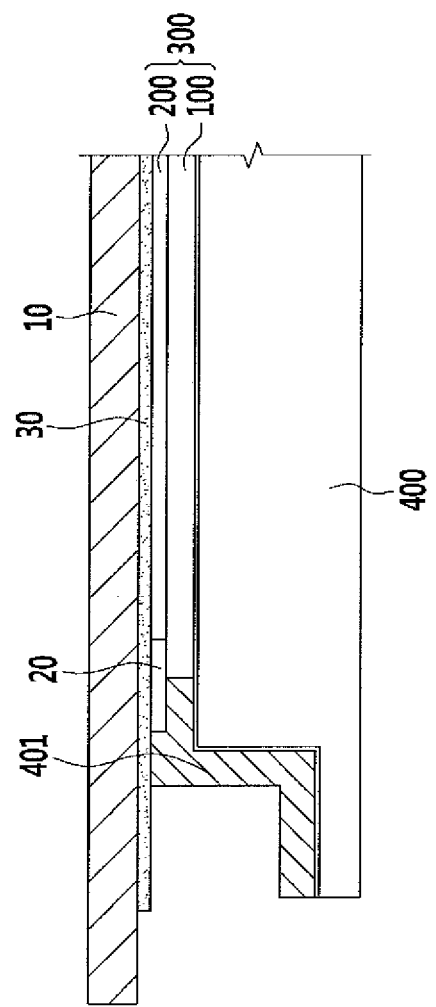
FIG. 6 is a cross-sectional view of a part of a liquid crystal display according to an exemplary embodiment of the present invention.

A liquid crystal display according to an exemplary embodiment of the present invention will be described with reference to FIG. 6. FIG. 6 is a cross-sectional view of a part of a liquid crystal display according to an exemplary embodiment of the present invention.

Referring to FIG. 6, the liquid crystal display according to the present exemplary embodiment is similar to the liquid crystal display previously described with reference to FIGS. 1 to 4. Descriptions of the similar structures will be omitted.

Referring to FIG. 6, the liquid crystal display according to the present exemplary embodiment further includes, for example, a conductive coupling layer 20 positioned between a side frame 401 and a liquid crystal panel 300.

The liquid crystal panel 300 of the liquid crystal display according to the present exemplary embodiment includes, for example, a lower display panel 100 on which a thin film transistor and the like is formed, and an upper display panel 200 on which a color filter and the like is formed. Alternatively, in an exemplary embodiment, the color filter may instead be formed on the lower display panel 100.

An additional electrode layer made of, for example, a transparent conductive material may be formed on an external surface which does not face the lower display panel 100 in a surface of the upper display panel 200. In this case, the additional electrode layer may be electrically connected to the side frame 401 through the conductive coupling layer 20 to be ground-processed.

As described above, in the liquid crystal display according to the present exemplary embodiment, the conductive coupling layer 20 is positioned between the side frame 401 and the liquid crystal panel 300, so that the additional electrode layer requiring the ground processing may be easily ground-processed.

All of the many characteristics of the liquid crystal display previously described with reference to FIGS. 1 to 4 and FIGS. 5 and 6 may be applied to the liquid crystal display according to the exemplary embodiment.

As described above, in the liquid crystal display according to exemplary embodiments of the present invention, the liquid crystal panel is coupled to the backlight assembly by using the side frame surrounding the side surface of the liquid crystal panel, tempered glass or a touch panel is attached on the entire surfaces of the side frame and the liquid crystal panel, so that an unnecessary space is not created between the liquid crystal panel and the tempered glass or the touch panel attached on the liquid crystal panel. Accordingly, display quality deterioration, such as a stain, due to a step between a receiving part of the liquid crystal panel and the backlight assembly is not generated, dust or moisture may be prevented from inflowing to a space between the tempered glass or the touch panel and the liquid crystal display panel, and the liquid crystal display may be thin.

Further, a width of the first surface of the side frame surrounding the liquid crystal panel is formed to be larger than that of the second surface surrounding the side surface of the backlight assembly, so that coupling strength between the backlight assembly and the tempered glass or the touch panel is increased, thereby increasing the reliability of packaging of the liquid crystal display.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. A liquid crystal display, comprising:
a liquid crystal panel;
a backlight assembly disposed at one side surface of the liquid crystal panel;
a side frame including a first surface surrounding an edge of the liquid crystal panel, a second surface surrounding a side surface of the backlight assembly, and a third surface projected from the second surface; and
an external panel attached to another side surface of the liquid crystal panel and on the side frame,
wherein a height of the first surface of the side frame is substantially equal to a height of a surface of the liquid crystal panel,
the first surface extends in a first direction toward the liquid crystal panel from the second surface and the third surface extends in a second direction opposite to the first direction from the second surface, and
a width of the first surface of the side frame is larger than a width of the second surface of the side frame.

2. The liquid crystal display of claim 1, further comprising: an adhesive layer disposed between the first surface of the side frame and the surface of the liquid crystal panel, and the external panel.

3. The liquid crystal display of claim 2, wherein the external panel is one of tempered glass or a touch panel.

4. The liquid crystal display of claim 3, further comprising: a lower case configured to receive the backlight assembly, and a horizontal surface of the lower case covers a surface of the backlight assembly, and a vertical surface of the lower case covers a side surface of the backlight assembly.

5. The liquid crystal display of claim 4, wherein the vertical surface of the lower case is disposed between the second surface of the side frame and the backlight assembly.

6. The liquid crystal display of claim 5, further comprising: an external cover configured to receive the lower case and the side frame.

7. The liquid crystal display of claim 6, further comprising: a plurality of coupling members configured to couple the side frame, the lower case, and the external cover.

8. The liquid crystal display of claim 7, further comprising: a conductive contacting layer disposed between the first surface of the side frame and the liquid crystal panel.

9. The liquid crystal display of claim 8, wherein: the liquid crystal panel comprises a lower display panel including a thin film transistor and an upper display panel including a color filter, the liquid crystal display further comprising: an additional transparent electrode layer disposed on an external surface which does not face the lower display panel in a surface of the upper display panel, and the additional transparent electrode layer is electrically connected to the side frame through the conductive contacting layer.

10. The liquid crystal display of claim 7, wherein the plurality of coupling members are screws.

11. The liquid crystal display of claim 1, further comprising: a lower case configured to receive the backlight assembly, and a horizontal surface of the lower case covers a surface of the backlight assembly, and a vertical surface of the lower case covers a side surface of the backlight assembly.

12. The liquid crystal display of claim 11, wherein the vertical surface of the lower case is disposed between the second surface of the side frame and the backlight assembly.

13. The liquid crystal display of claim 12, further comprising: an external cover configured to receive the lower case and the side frame.

14. The liquid crystal display of claim 13, further comprising: a plurality of coupling members configured to couple the side frame, the lower case, and the external cover.

15. The liquid crystal display of claim 14, further comprising: a conductive contacting layer disposed between the first surface of the side frame and the liquid crystal panel.

16. The liquid crystal display of claim 15, wherein: the liquid crystal panel comprises a lower display panel including a thin film transistor and an upper display panel including a color filter, the liquid crystal display further comprising: an additional transparent electrode layer disposed on an external surface which does not face the lower display panel in a surface of the upper display panel, and the additional transparent electrode layer is electrically connected to the side frame through the conductive contacting layer.

17. The liquid crystal display of claim 1, further comprising: an external cover configured to receive the side frame and the backlight assembly.

18. The liquid crystal display of claim 17, further comprising: a plurality of coupling members configured to couple the side frame, the backlight assembly, and the external cover.

19. The liquid crystal display of claim 1, further comprising: a conductive contacting layer disposed between the first surface of the side frame and the liquid crystal panel.

20. The liquid crystal display of claim 19, wherein: the liquid crystal panel comprises a lower display panel including a thin film transistor and an upper display panel including a color filter, the liquid crystal display further comprising: an additional transparent electrode layer disposed on an external surface which does not face the lower display panel in a surface of the upper display panel, and the additional transparent electrode layer is electrically connected to the side frame through the conductive contacting layer.

* * * * *